US011496623B2

(12) United States Patent
Ding

(10) Patent No.: US 11,496,623 B2
(45) Date of Patent: Nov. 8, 2022

(54) ANNOUNCEMENT OR ADVERTISEMENT IN TEXT OR VIDEO FORMAT FOR REAL TIME TEXT OR VIDEO CALLS

(71) Applicant: T-Mobile USA, Inc., Bellevue, WA (US)

(72) Inventor: Tianmin Ding, Newcastle, WA (US)

(73) Assignee: T-MOBILE USA, INC., Bellevue, WA (US)

(*) Notice: Subject to any disclaimer, the term of this patent is extended or adjusted under 35 U.S.C. 154(b) by 0 days.

(21) Appl. No.: 17/366,447

(22) Filed: Jul. 2, 2021

(65) Prior Publication Data
US 2021/0337068 A1 Oct. 28, 2021

Related U.S. Application Data

(63) Continuation of application No. 16/835,976, filed on Mar. 31, 2020, now Pat. No. 11,082,557.

(51) Int. Cl.
H04M 3/487 (2006.01)
H04M 3/42 (2006.01)

(52) U.S. Cl.
CPC ..... H04M 3/4872 (2013.01); H04M 3/42382 (2013.01)

(58) Field of Classification Search
CPC ................. H04M 3/4872; H04M 3/42382
USPC ...................................... 379/88.13
See application file for complete search history.

(56) References Cited

U.S. PATENT DOCUMENTS

| 5,956,681 | A | * | 9/1999 | Yamakita | ................ | G10L 15/26 |
| | | | | | | 704/235 |
| 7,443,964 | B2 | * | 10/2008 | Urban | ..................... | H04W 4/20 |
| | | | | | | 379/85 |
| 7,729,484 | B1 | | 6/2010 | Coppage | | |
| 8,509,408 | B2 | | 8/2013 | Goodman et al. | | |
| 8,780,794 | B2 | | 7/2014 | Masson | | |
| 9,531,882 | B1 | | 12/2016 | McClintock et al. | | |
| 9,906,927 | B2 | | 2/2018 | Levien et al. | | |
| 10,404,632 | B2 | | 9/2019 | Chiang | | |
| 10,498,775 | B2 | | 12/2019 | Chiang et al. | | |
| 2001/0028705 | A1 | | 10/2001 | Adams et al. | | |
| 2005/0066085 | A1 | * | 3/2005 | Kobayashi | ................ | G06F 3/14 |
| | | | | | | 710/64 |
| 2005/0220139 | A1 | | 10/2005 | Aholainen | | |
| 2005/0234969 | A1 | | 10/2005 | Mamou et al. | | |
| 2007/0174388 | A1 | | 7/2007 | Williams | | |
| 2008/0242325 | A1 | | 10/2008 | Bandera et al. | | |
| 2009/0313669 | A1 | * | 12/2009 | Boudani | .......... | H04N 21/64707 |
| | | | | | | 725/109 |

(Continued)

Primary Examiner — Binh Kien Tieu
(74) Attorney, Agent, or Firm — Summit Patents PC

(57) ABSTRACT

A telecommunications network for playing an enhanced announcement in the same format as that of an enhanced call is described herein. An enhanced call is a call via real time text or video. The telecommunications network includes a node or subsystem, such as an IP multimedia subsystem core (IMS or IMS core), programmed to receive an enhanced call in a text or video format, detect the format of the enhanced call, and return an enhanced announcement—an announcement provided in the same format as the enhanced call. The IMS core can include one or more sub-nodes or sub-components, including a telephony application server (TAS), a media resource function (MRF), or both.

18 Claims, 3 Drawing Sheets

(56) References Cited

U.S. PATENT DOCUMENTS

| | | |
|---|---|---|
| 2010/0027765 A1 | 2/2010 | Schultz et al. |
| 2010/0050214 A1* | 2/2010 | Funabiki ............ H04L 12/2807 |
| | | 725/81 |
| 2010/0223314 A1 | 9/2010 | Gadel et al. |
| 2010/0262667 A1 | 10/2010 | Briand et al. |
| 2018/0052941 A1 | 2/2018 | Codignotto |

* cited by examiner

ANNOUNCEMENT OR ADVERTISEMENT IN TEXT OR VIDEO FORMAT FOR REAL TIME TEXT OR VIDEO CALLS

CROSS-REFERENCE TO RELATED APPLICATION

This application claims priority to and is a continuation of U.S. application Ser. No. 16/835,976, filed Mar. 31, 2020, the contents of which are herein incorporated by reference in its entirety.

BACKGROUND

Current telecommunications networks allow for audio, video, or real time text (RTT) calling. Furthermore, in 2016, the Federal Communications Commission (FCC) adopted rules to transition from text telephony (TTY) to real-time text (RTT) technology. These networks can add audio announcements, whether during call treatment or while the call is in progress. For example, a subscriber may be running low on pre-paid minutes. The network can notify the subscriber, via an audio announcement during the call, that the pre-paid balance is running low—the subscriber can add more minutes or allow the minutes to expire, thereby dropping the call.

However, these networks do not allow for announcements to be made, whether during call treatment or while the call is in progress, in any format other than audio. Therefore, these networks do not account for situations in which the audio announcements may not be heard or comprehended by a party, such as the caller. For example, in an RTT call, the caller may be hearing-impaired. Playing an audio announcement during the call treatment of an RTT call when the caller is hearing-impaired is impractical because the announcement may not be heard or may not be intelligible to the caller.

What is needed is a telecommunications network that improves service to speech-impaired or hearing-impaired customers (or customers who are both speech-impaired and hearing-impaired) to serve a broader customer base. What is further needed is a telecommunications network that provides quality and reliable multimedia communications.

DETAILED DESCRIPTION

Figure 1:
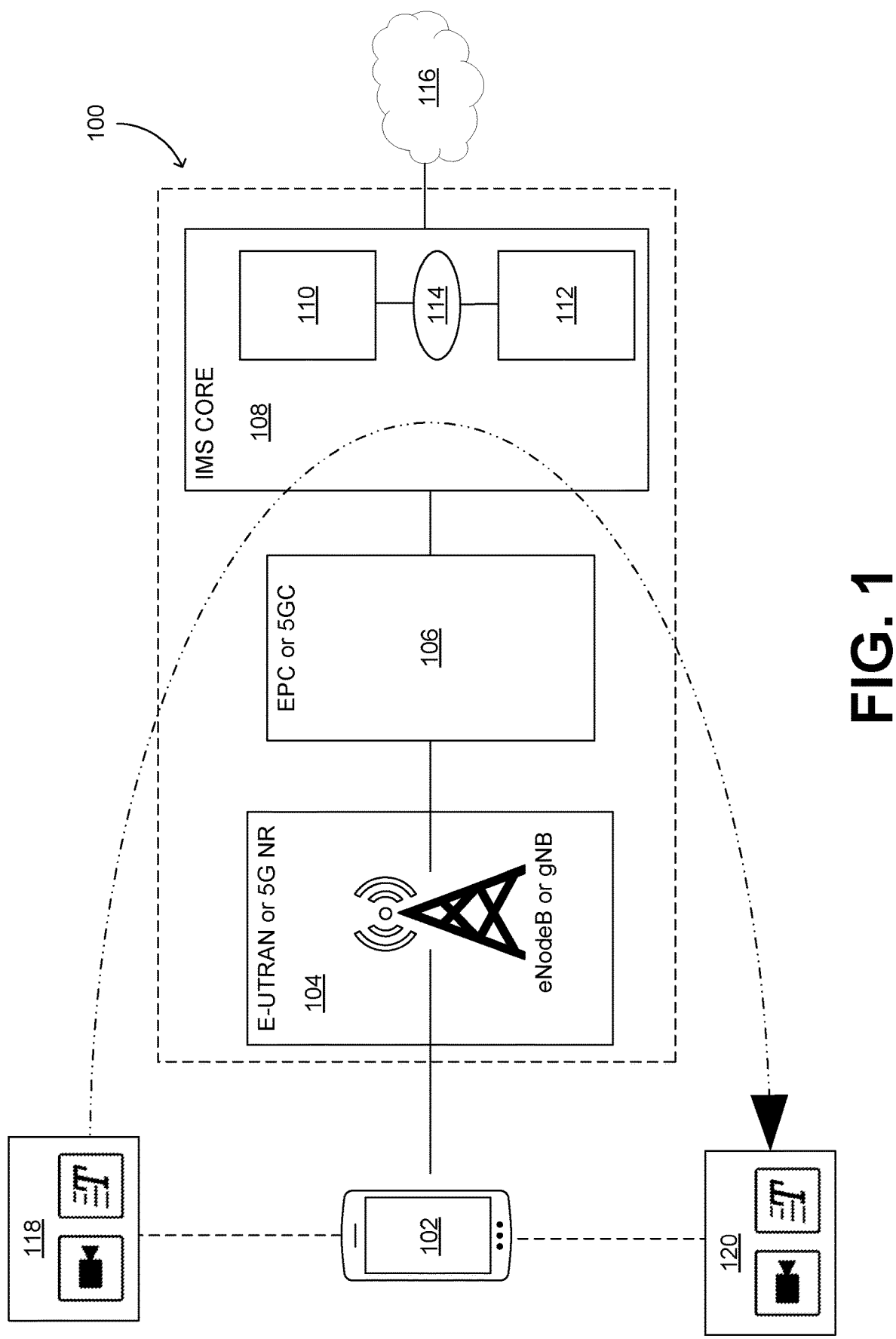
FIG. 1 illustrates an example telecommunications network.

A telecommunications network for playing an enhanced announcement in the same format as that of an enhanced call is described herein. The telecommunications network, by transmitting non-audio data (e.g., text, video, or both) of an enhanced call, is programmed to detect the type of non-audio data and to generate an instruction to output an enhanced announcement to the caller in the same format. An enhanced call is a call vi an RTT or video. The telecommunications network includes a node or subsystem, such as an IP multimedia subsystem core (IMS or IMS core), programmed to receive an enhanced call in a text or video format, detect the format of the enhanced call, and return an enhanced announcement—an announcement provided in the same format as the enhanced call. The IMS core can include one or more sub-nodes or sub-components, including a telephony application server (TAS), a media resource function (MRF), or both.

Though the enhanced call is discussed as including non-audio data (e.g., text or video), the enhanced call can include audio data. The audio data can be included to permit the call recipient, such as in a voicemail, or secondary service, such as a voicemail server or audio to text conversion for RTT, to more efficiently comprehend or transmit a communication. For example, it may be desirous for the call recipient to hear what the caller is saying in a video voicemail.

The telecommunications network plays the announcement during call treatment or call processing. Call treatment relates to how a call is handled, whether within a telecommunications network or at the receiver end. Examples of call treatment include, without limitation, call forwarding, call waiting, sending to voicemail, or the like. A caller, for example, sent to voicemail during a video call, receives an enhanced announcement including a video component that the receiver is unavailable. As another example, the caller during an RTT call receives an enhanced announcement including a text component that the receiver is currently busy. As yet another example, the caller during a video call, such as when the caller is on call waiting, receives an announcement including a video advertisement announcement for one or more products, services, or the like. Integrating multimedia advertisements can be less intrusive than audio advertisements, for example, as the multimedia advertisement can be played simultaneously with the multimedia call treatments.

For example, the enhanced announcement can be a notification that a call recipient is busy, a notification that the caller has a low balance as a prepaid subscriber, a user prompt, a user output including a notification, an advertisement, one or more directions, a map, the like, or combinations thereof.

Call processing relates to the processing of the call through the telecommunications network. During call processing, a caller can receive information about the account (e.g., number of pre-paid minutes remaining, etc.) or any other appropriate information.

In one embodiment, a telecommunications network for call treatment includes a first network node programmed to receive, from user equipment of a caller, an enhanced call in a text or video format. The first network node is further programmed to detect the first format of the enhanced call. The first network node is further programmed to generate an instruction to output an enhanced announcement in the same format as the enhanced call to the user equipment of the caller. The enhanced announcement is in a text format or a video format. The first network node is further programmed to transmit the text or video data associated with the enhanced call.

For example, the first network node receives information (e.g., via the signal, the traffic, or both) associated with the enhanced call. The first network node, based on the associated information, detects and determines the type of enhanced call—text or video. The first network node receives text/audio data for an RTT or video/audio data for a video call. Instead of suppressing the text or video data for an RTT or video call, such as by setting the appropriate port to 0 (i.e., Text=0, Video=0), respectively, the first network node is programmed to transmit the associated data (i.e., Text≠0, Video≠0) to a second network node or to another system or server, such as a voicemail server, such as by not setting the appropriate port to 0. In other words, rather than setting the text port, video port, or both to 0, the text port, video port, or both are kept in respective service requests, and media port numbers assigned for a terminated side (e.g., MRF or voicemail) are transferred back to the caller or call originator. In one embodiment, the first network node is programmed to output the announcement based on the type of enhanced call (an announcement identifier can be included if it desirous to do so). In another embodiment, the first network node provides an announcement identifier (e.g., T for text or V for video) based on the type of enhanced call in a communication with the second network node to prompt the second network node as to the type of file(s) or announcement.

The first network node can be a TAS or an IMS, for example. When the first network node is the IMS, the first network node includes two sub-nodes: the TAS and an MRF—the TAS and the MRF are in communication with each other, such as through an interface, such as a 3GPP Mr interface. The TAS is programmed to perform the receiving, detecting, and returning steps and to communicate enhanced call information to the MRF. The MRF is programmed to integrate one or more files into the announcement thereby creating the enhanced announcement.

In another embodiment, a telecommunications network includes a first network node (e.g., a TAS) and a second network node (e.g., an MRF). The first network node is programmed to receive an enhanced call in a text or video format from the user equipment of a caller. It also detects the first format of the enhanced call and communicates enhanced call information to the second network node. The first network node generates an instruction to the user equipment of the caller to output an enhanced announcement in the same format as the enhanced call. The second network node is programmed to integrate one or more files into an announcement thereby creating the enhanced announcement. The first network node is further programmed to transmit the text or video data associated with the enhanced call.

For example, to integrate one or more files, the MRF can be invoked by single-purpose protocols (e.g., NETANN, or Network Announcement, which is an announcement server that can be directed to media files or put callers conference, such as by adding directives to the session initiation protocol (SIP) universal resource locator (URL) for a media server, such as PowerMedia XMS). This can be implemented for actions (e.g., such as post-call enhanced announcements) where the TAS hands over the control of the session to the MRF. The interaction script that the MRF executes for the call can be specified by the single-purpose protocols.

As another example, to integrate one or more files, the TAS uses other protocols (e.g., such as XML-based) to control the MRF, such as by media server markup language (MSML). The TAS forwards the SIP INVITE with the session description protocol (SDP) information to the MRF. The MRF establishes a real-time transport protocol (RTP) stream with the user equipment. The TAS then sends MSML documents inside SIP INFO messages with the actions that MRF should execute (e.g., prompt enhanced announcement to be played by user equipment).

The telecommunications network can include an access network to transmit the enhanced call from the user equipment of the caller and the first announcement to the user equipment of the caller. The telecommunications network can also include a data core to communicate the enhanced call between the access network and the first network node In a first example, a caller initiates an RTT call. Since the call recipient does not have call forwarding or call waiting, The IMS is programmed to prompt an enhanced announcement that call recipient is busy. The IMS connects the RTT with a current media player to send text-formatted information. The user equipment of the caller receives an instruction prompting the user equipment to display the text-formatted information about the call recipient's availability (or lack thereof).

In a second example, a caller initiates an RTT call—caller is a prepaid subscriber whose balance is running at or below a certain dollar value or amount of available minutes. The IMS is programmed to prompt an enhance announcement of a low balance. The IMS connects the RTT with a current media player to send text-formatted information. The user equipment of the caller receives an instruction prompting the user equipment to display the text-formatted information about the low balance and the ability to purchase more time/credits.

In a third example, a caller initiates a video call. The IMS is programmed to prompt an enhance announcement for one or more conditions, as discussed above. The IMS connects the video call with a current media player to send video-formatted information (audio information can be included). The user equipment of the caller receives an instruction prompting the user equipment to play the video-formatted information (and audio information, where appropriate).

In a fourth example, a caller initiates an enhanced call. The IMS is programmed to prompt an advertisement. The IMS connects the enhanced call with a current media player to send information formatted in the format as the enhanced call (audio information can be included, where appropriate). The user equipment of the caller receives an instruction prompting the user equipment to display or play the text- or video-formatted information (and audio information, where appropriate). The multimedia advertisement can be sent at the same time as the instruction.

Though the examples above illustrate cases in which the enhanced announcement is played or displayed in the same format as the enhanced call (i.e., RTT and text; video and video), the enhanced announcement can be in a format different than the call (i.e., RTT and video; video and text), when it is desirous to do so. Furthermore, though text and video are discussed, the announcement can be in any appropriate visual format, including, for example, an image.

FIG. 1 shows a telecommunications network 100 and an enhanced call 118 originating from user equipment 102 resulting in an enhanced announcement 120—the enhanced call 118 having been processed through the telecommunications network 100. The user equipment 102 is any device used by an end-user, such as a caller, for communication purposes, including, without limitation, a mobile phone, a smartphone, a tablet, a personal digital assistant, a laptop with mobile connectivity, or the like.

The telecommunications network 100 includes an access network 104 (e.g., E-UTRAN; VoLTE; 5G NR; VoNR) which includes at least one base station (e.g., eNodeB or gNB), a data core 106 (e.g., an evolved packet core (EPC) or 5G Core), and an IP multimedia subsystem (IMS) 108 which includes a telephony application server (TAS) 110 and a media resource function (MRF) 112.

The access network 104 handles communications between the user equipment 102 and the data core 106. The base station of the access network 104 controls the user equipment within a given cell. For example, the base station sends and receives radio transmission(s) to the user equipment using analogue and digital signal processing functions of the access network air interface. The base station also controls low-level operations of the user equipment via signaling messages, such as handover commands.

The data core 106 is an IP-based core network infrastructure that provides packet data services, such as to support the convergence of licensed and unlicensed radio technologies. The data core 106 which can be defined around various paradigms, including mobility, policy management, and security. The three core elements of the data core 106 include a mobility management entity (MME), a serving gateway (SGW), and a packet data network gateway (PGW). The data core 106 communicates (e.g., sends traffic) with the IMS 108 via the PGW.

The IMS 108, which includes the TAS 110 and the MRF 112, is an architectural framework for delivering IP multimedia services. The IMS 108 also handles session management and media control. The IMS 108 can communicate with a secondary network 116, such as a public switched telephone network, via a gateway.

The TAS 110 and the MRF 112 are in communication with each other, such as via an interface 114. The TAS 110 contains the service logic that provides the basic call-processing services, including digital analysis, routing, call setup, call waiting, call forwarding, conferencing, and the like. Furthermore, the TAS 110 provides the call code, mapping of treatment, identification of announcement, or combinations thereof.

The MRF 112, which includes two components (i.e., MRF controller and MRF processor), hosts the media manipulation and end point capabilities to play, record, detect in-band dual-tone multi-frequency signaling, transcode, perform call bridging, conference, perform bridging functions that fall under TAS influence, help render media-interactive services, and the like. The MRF 112 can also include one or more files to be integrated into the announcement, such as the announcement provided by or to be sent by the TAS 110. The one or more files can be integrated by the MRF, such as by mixing or the like, when initiated by one or more protocols (e.g., NETANN, XML-based, or the like), as discussed above.

Figure 2:
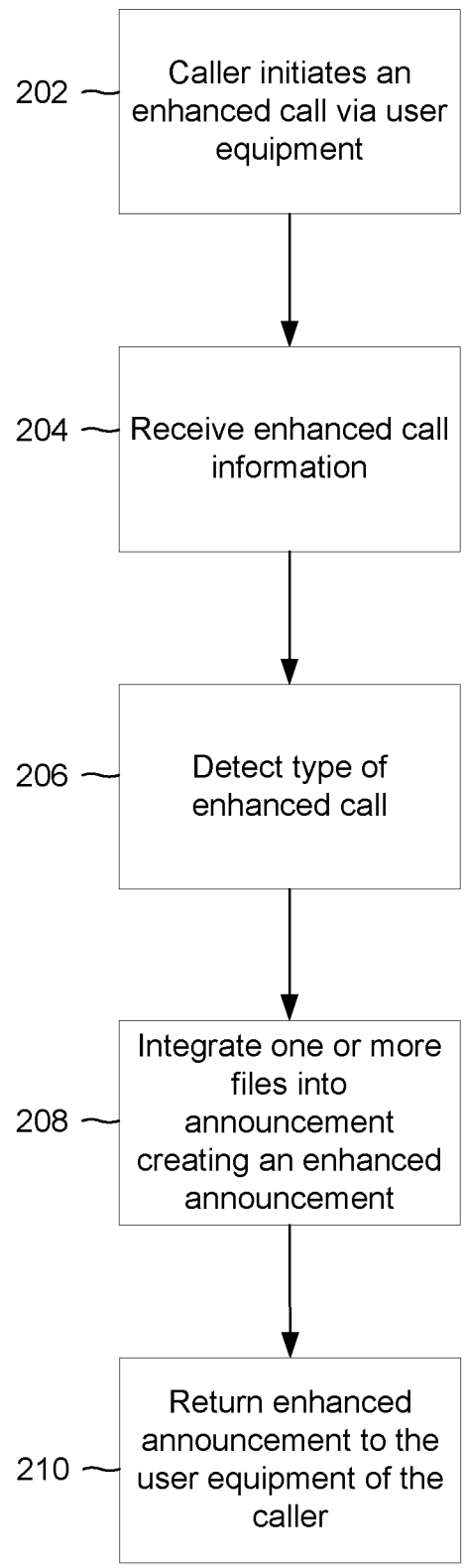
FIG. 2 illustrates an example method of playing an announcement in the same format as an enhanced call.

FIG. 2 shows a method of playing an announcement in the same format as an enhanced call. At 202, a caller initiates an enhanced call via the user equipment 102. As shown in FIG. 1, the enhanced call can be an RTT or video call. In one embodiment, the RTT call includes text and audio data. In another embodiment, the video call includes video and audio data. The signal and traffic associated with the enhanced call 118 is communicated to the data core 106 via the base station of the access network 104. The data core 106 then transfers the traffic to the IMS 108 via the PGW.

Figure 3:
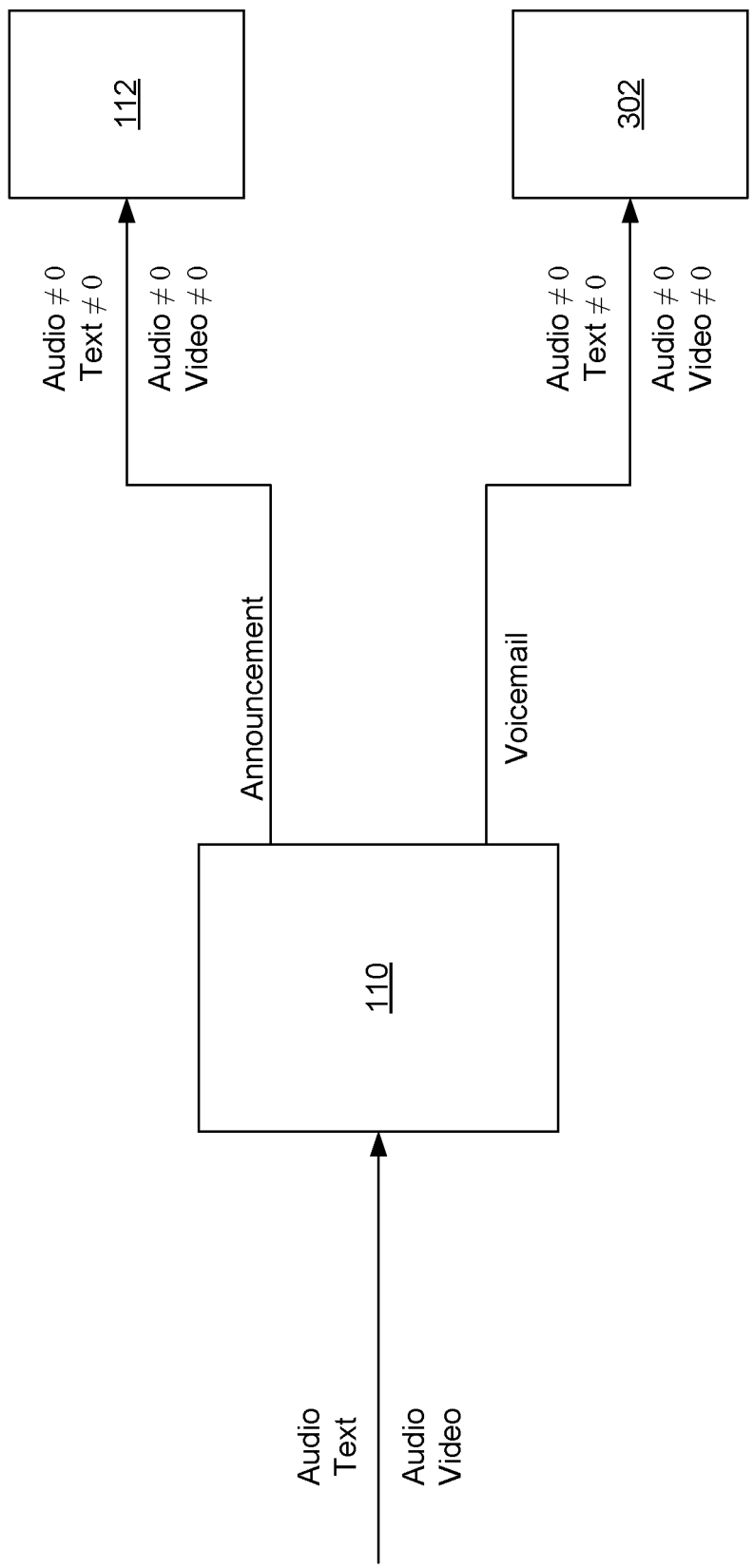
FIG. 3 illustrates an example transmission of multimedia data along a portion of the example telecommunications network.

Returning to FIG. 2, at 204, the information of the enhanced call is received. At 206, the type of enhanced call is detected and determined. As shown in FIG. 3, the TAS 110 receives information (e.g., via the signal, the traffic, or both) associated with the enhanced call 118. The TAS 110, based on the associated information, detects and determines the type of enhanced call—text or video. The TAS 110 receives text/audio data for an RTT or video/audio data for a video call. Instead of suppressing the text or video data for an RTT or video call (i.e., Text=0, Video=0), respectively, the TAS 110 is programmed to transmit the associated data (i.e., Text≠0, Video≠0) to the MRF 112 or another system or server, such as a voicemail server 302. In other words, rather than setting the text port, video port, or both to 0, the text port, video port, or both are kept in respective service requests, and media port numbers assigned for a terminated side (e.g., MRF or voicemail) are transferred back to the caller or call originator. In another embodiment, the TAS 110 provides an announcement identifier (e.g., T for text or V for video) based on the type of enhanced call in a communication with the MRF 112 to prompt the MRF 112 as to the type of file(s) or announcement.

Returning to FIG. 2, at 208, the one or more files are integrated into an announcement thereby creating an enhanced announcement. The one or more files can be integrated by the MRF, such as by mixing or the like, when initiated by one or more protocols (e.g., NETANN, XML-based, or the like). The one or more files are in the same format as that of the detected enhanced call. In one embodiment, the TAS provides the announcement to the MRF, such that the MRF can integrate one or more files into the announcement, thereby creating the enhanced announcement. For example, the TAS provides an announcement with a video identifier. The MRF integrates one or more video files to create an enhanced video announcement. In another embodiment, the TAS provides the announcement to the MRF, such that the MRF can provide one or more files to be integrated into the announcement, thereby creating the enhanced announcement. For example, the TAS provides an announcement with a text identifier. The MRF provides one or more text files to be integrated into the announcement. The TAS integrates the one or more text files with the announcement, thereby creating the enhanced announcement. In yet another embodiment, the TAS provides an announcement identification, such that the MRF can provide the enhanced announcement based on the announcement identification. For example, the TAS provides a video announcement identifier. The MRF, recognizing the video announcement identifier, incorporates a video announcement to be played by the caller user equipment by one or more signals or prompts. In yet another embodiment, the MRF provides the announcements and integrates the one or more files, as discussed above, based on information received from the TAS. For example, the TAS determines the enhanced call is a video call. The TAS transmits information to the MRF that the enhanced call is in video format. The MRF generates the announcement and integrates one or more video files.

At 210, the enhanced announcement is transmitted from the IMS 108 to the user equipment 102. In one embodiment, the enhanced announcement is transmitted to the caller via the TAS 110, such as by a process similar to communicating the enhanced call to the MRF 112 but in reverse. In another embodiment, the enhanced announcement is returned to the caller via a different route or protocol. For example, via the MRF 112 when initiated by one or more protocols (e.g., NETANN, XML-based, or the like), as discussed above.

Though enhanced announcements are discussed herein, enhanced voicemails (i.e., voicemails in the same format as the enhanced calls) can be left for the recipient, if it is desirous to do so, such as by connecting to the voicemail server. The TAS 110 transmits the video information with the audio information to the voicemail server programmed to receive video information. The recipient user equipment, being also programmed to play video information, can open and play the enhanced voicemail.

Embodiments of the invention can include a non-transitory computer readable medium which can store instructions for performing the above-described methods and any steps thereof, including any combinations of the same. For example, the non-transitory computer readable medium can store instructions for execution by one or more processors or similar devices.

Further embodiments of the present invention can also include the one or more user equipment(s), network nodes, or servers which read out and execute computer executable instructions, such as a non-transitory computer-readable medium, recorded or stored on a storage medium (which may be the same as or different than the storage medium for storing images or files, as discussed above), to perform the functions of any embodiment. The user equipment or server may include one or more of a central processing unit (CPU), micro processing unit (MPU), or other circuitry, such as a processor, and may include a network of separate user equipment or servers or separate computer processors. The computer executable instructions may be provided to the user equipment, network node, or server, for example, from a network or the storage medium.

Though certain elements, aspects, components or the like are described in relation to one embodiment or example of a telecommunications network, those elements, aspects, components or the like can be including with any other telecommunications network, such as when it desirous or advantageous to do so.

The foregoing description, for purposes of explanation, used specific nomenclature to provide a thorough understanding of the disclosure. However, it will be apparent to one skilled in the art that the specific details are not required in order to practice the systems and methods described herein. The foregoing descriptions of specific embodiments or examples are presented by way of examples for purposes of illustration and description. They are not intended to be exhaustive of or to limit this disclosure to the precise forms described. Many modifications and variations are possible in view of the above teachings. The embodiments or examples are shown and described in order to best explain the principles of this disclosure and practical applications, to thereby enable others skilled in the art to best utilize this disclosure and various embodiments or examples with various modifications as are suited to the particular use contemplated. It is intended that the scope of this disclosure be defined by the following claims and their equivalents:

What is claimed is:

1. A telecommunications network for call treatment, the network comprising:
    a first network node programmed to:
        detect, from a transmission received from a user equipment, data relating to an enhanced call that includes audio data and has a media format that includes one or both of text data or video data,
        based on the detected media format, set a media port of the first network node to permit transmission of a signal that includes one or both of the text data or the video data, and
        based on the setting of the media port to transmit one or both of the text data or the video data, transmit one or both of the text data or the video data from the media port,
        simultaneously with transmitting the one or both of the text data or the video data, transmitting the audio data from an audio port of the first network node,
    the second network node programmed to:
        receive the audio data and one or both of the text data and the video data, and
        output an enhanced announcement in the detected media format that includes the audio data and one or both of the text data and the video data.

2. The telecommunications network of claim 1, wherein the first network node is programmed to set the media port to a non-zero value to permit transmission of the signal that includes one or both of the text data or the video data.

3. The telecommunications network of claim 2, wherein the first network node is programmed to, before detecting the media format, set the media port to block transmission of the signal that includes one or both of the text data or the video data.

4. The telecommunications network of claim 3, wherein the first network node is programmed to set the media port to a zero value to block transmission of the signal that includes one or both of the text data or the video data.

5. The telecommunications network of claim 1, wherein the first network node is a telephony application server or an IP multimedia subsystem.

6. The telecommunications network of claim 1, the first network node comprises two sub-nodes.

7. The telecommunications network of claim 6, wherein one of the sub-nodes is a telephony application server and the other sub-node is a media resource function.

8. The telecommunications network of claim 6, wherein the two sub-nodes are in communication with each other.

9. The telecommunications network of claim 1, wherein the first network node is a telephony application server and the second network node is a media resource function or a voicemail server.

10. A method for call treatment, the method comprising:
    detecting, from a transmission of a user equipment, data relating to an enhanced call that includes audio data and has a media format that includes one or both of text data or video data,
    based on the detected media format, setting a media port of the first network node to permit transmission of a signal that includes one or both of the text data or the video data, and
    based on the setting of the media port to transmit one or both of the text data or the video data, transmitting one or both of the text data or the video data from the media port to a second network node,
    simultaneously with transmitting the one or both of the text data or the video data, transmitting the audio data from an audio port of the first network node to the second network node, and
    causing the second network node to output an enhanced announcement in the detected media format that includes the audio data and one or both of the text data and the video data.

11. The method of claim 10, wherein setting a media port of the first network node to permit transmission of the signal includes setting the media port to a non-zero value.

12. The method of claim 11, wherein the media port, before detecting the media format, is set to block transmission of the signal.

13. The method of claim 12, wherein the media port is set to a zero value to block transmission of the signal.

14. The method of claim 10, wherein the first network node is a telephony application server or an IP multimedia subsystem.

15. The method of claim 10, the first network node comprises two sub-nodes.

16. The method of claim 15, wherein one of the sub-nodes is a telephony application server and the other sub-node is a media resource function.

17. The method of claim 15, wherein the two sub-nodes are in communication with each other.

18. The method of claim 10, wherein the first network node is a telephony application server and the second network node is a media resource function or a voicemail server.

* * * * *